United States Patent [19]
Lee et al.

[11] Patent Number: 5,921,095
[45] Date of Patent: Jul. 13, 1999

[54] EXPANDABLE TYPE REFRIGERATOR

[75] Inventors: Sang Ryul Lee; Sung Ryong Jeong, both of Kyungsangnam-Do, Rep. of Korea

[73] Assignee: LG Electronics Inc., Rep. of Korea

[21] Appl. No.: 08/851,569

[22] Filed: May 5, 1997

[30] Foreign Application Priority Data

Dec. 11, 1996 [KR] Rep. of Korea ................. 96-64101
Dec. 20, 1996 [KR] Rep. of Korea ................. 96-68801

[51] Int. Cl.[6] ........................................ F25B 7/00
[52] U.S. Cl. ...................... 62/175; 62/127; 62/298; 62/441; 62/DIG. 13
[58] Field of Search ..................... 62/129, 127, 126, 62/331, 326, 298, 259.1, 237, 441, 448, DIG. 13, 175

[56] References Cited

U.S. PATENT DOCUMENTS

| | | | |
|---|---|---|---|
| 1,321,097 | 11/1919 | Gonzalez | 62/298 X |
| 2,812,642 | 11/1957 | Jacobs | 62/441 X |
| 4,311,439 | 1/1982 | Stofen | 62/298 X |
| 4,895,001 | 1/1990 | Jondahl | 62/298 X |
| 4,966,004 | 10/1990 | Midlang et al. | 62/127 X |

*Primary Examiner*—Harry B. Tanner
*Attorney, Agent, or Firm*—Ostrolenk, Faber, Gerb & Soffen, LLP

[57] ABSTRACT

An expandable type refrigerator which is capable of coupling a plurality of refrigerating units or freezing units which each have an independent operational cycles and a predetermined size and is easily expanded at the site of refrigerator installation by coupling a plurality of the refrigerating units or freezing units, wherein each refrigerating unit or freezing unit is capable of controlling one micro-controller by using one power cord. The refrigerator includes more than at least two refrigerating units (or two freezing units) each of which is operable with a different operational cycle and which refrigerating units are coupled to each other at an installation site, a coupling apparatus for coupling the refrigerating units, one external power cord for supplying an electric power to the refrigerating units (or the freezing units), and an operational cycle controller for independently controlling the operational cycles of the refrigerating units (or the freezing units).

12 Claims, 13 Drawing Sheets

FIG. 12

| INPUT SIGNALS | | | | SYSTEM CONFIGURATION |
|---|---|---|---|---|
| L | L | L | L | REFRIGERATING+REFRIGERATING+REFRIGERATING |
| L | L | L | H | REFRIGERATING+REFRIGERATING+FREEZING |
| L | L | H | L | REFRIGERATING+FREEZING+REFRIGERATING |
| L | L | H | H | REFRIGERATING+FREEZING+FREEZING |
| H | L | L | L | FREEZING+REFRIGERATING+REFRIGERATING |
| H | L | L | H | FREEZING+REFRIGERATING+FREEZING |
| H | L | H | L | FREEZING+FREEZING+REFRIGERATING |
| H | L | H | H | FREEZING+FREEZING+FREEZING |

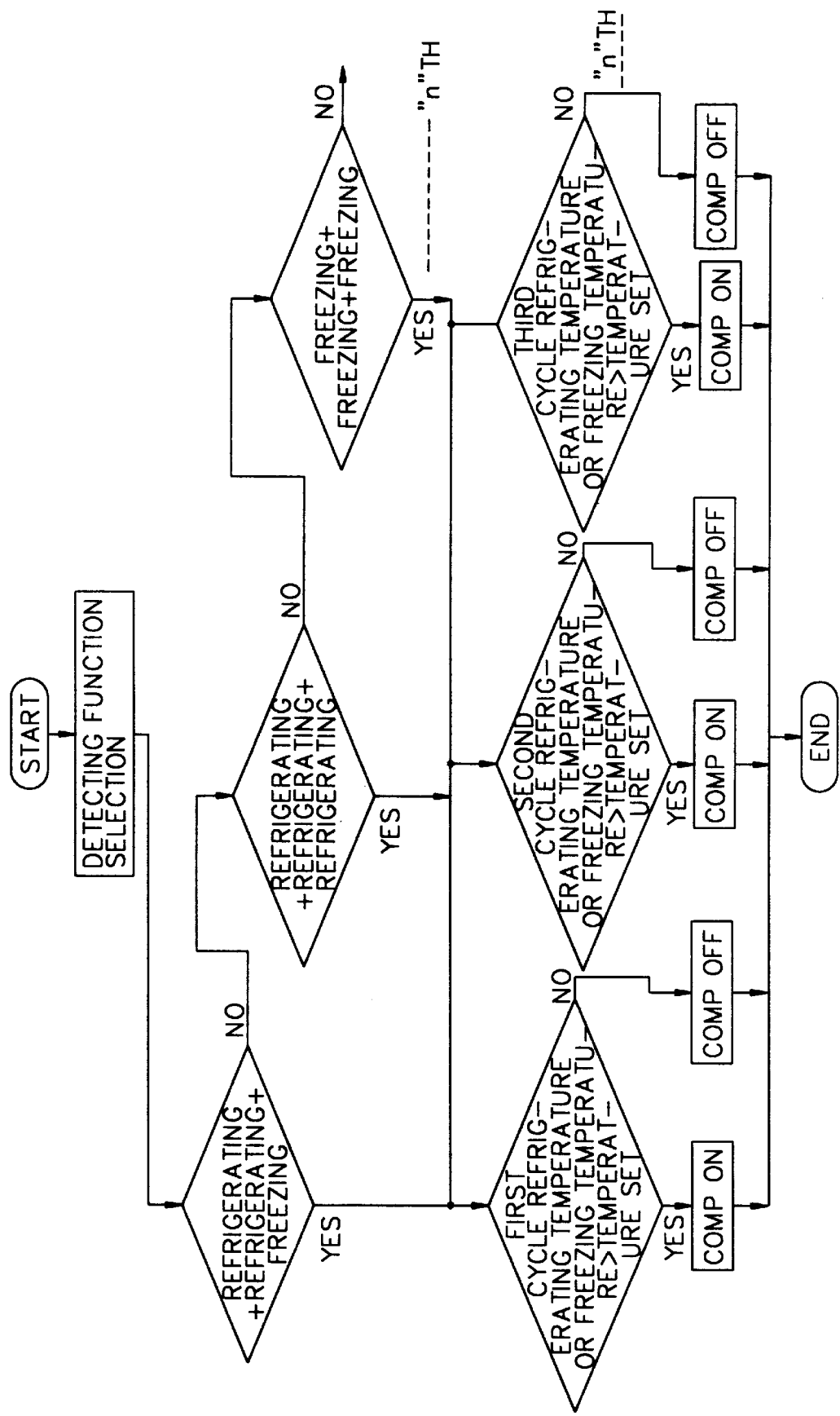

EXPANDABLE TYPE REFRIGERATOR

BACKGROUND OF THE INVENTION

1. Field of the Invention

The present invention relates to an expandable type refrigerator, and in particular to an improved expandable type refrigerator which is capable of coupling a plurality of refrigerating units (or freezing units) which each have an independent operational cycle and a predetermined size and is easily expanded at the site of refrigerator installation by coupling a plurality of the refrigerating units (or freezing units), wherein each refrigerating unit (or freezing unit) is capable of controlling one micro-controller by using one power cord.

2. Description of the Conventional Art

The larger refrigerator is generally used in a restaurant or the like for storing a large amount of foods.

In the conventional refrigerator which is generally used in a restaurant or the like, as shown in FIG. 1, the interior of the same is divided into a refrigerating compartment and a freezing compartment. In addition, a plurality of racks are provided in a storing space 1 formed inside the refrigerator. A plurality of doors 2 are attached on the front surface of the refrigerator, and the doors 2 include door knobs 2a.

A machinery section 7 is formed in an upper portion of the refrigerator, in which machinery section 7, one or more compressors 6 is/are installed for generating cooled air.

A micro-controller 8 is installed in the machinery section 7 for controlling the temperature of the storing space 1 of the refrigerator.

Additionally, the micro-controller 8 controls the operation of a damper disposed to control the amount of cooling air which is supplied into the storing space 1 of the refrigerator, for thereby controlling the temperature of the storing space 1 and a fan provided for circulating the air in the refrigerator. In addition, the micro-controller 8 controls the temperature which is detected by a sensor disposed for sensing the temperature in the storing space 1 of the refrigerator, for thereby controlling a proper operational load for the system.

Each sidewall of the refrigerator is formed of inner and outer steel plates having a predetermined space therebetween, and an insulation member 5 such as a urethan foam is filled thereinto, and a plurality of wheels 9 are installed on the bottom surface of the refrigerator for easier movement thereof.

The cooled air flow in the conventional refrigerator will now be explained with reference to the accompanying drawings.

As shown in FIG. 2, the temperature of the refrigerating compartment and the freezing compartment which are detected by freezing and refrigerating sensors are compared with a previously set temperature.

As a result, if the temperature detected by the freezing sensor is higher than a previously set temperature, the compressor 6 and a cooling fan are continuously driven, thereby lowering the temperature, and on the contrary, if the temperature detected by the freezing sensor is lower than the same, the operation of the compressor 6 and the cooling fan are not stopped.

In addition, if the temperature detected by the refrigerating sensor is higher than the temperature of the refrigerating compartment, the damper is controlled to be open, thereby supplying cooled air into the refrigerating compartment, and on the contrary, if the temperature detected by the refriger- ating sensor is lower than the same, the damper is controlled to be closed, for thus blocking the air supply into the refrigerating compartment.

However, since the weight of the conventional refrigerator is about 180 Kg, and the capacity thereof is about 1100 liter, and the volume thereof is so bulky, it is very difficult to move the refrigerator to the installation site of the refrigerator. If the door size of a refrigerator installation site of the restaurant is small, it is impossible to carry the refrigerator to the installation site of the restaurant or the like.

In addition, when a restaurant needs a bigger capacity refrigerator, one or more refrigerator(s) should be additionally installed. At this time, the existing refrigerator and the additionally provided refrigerator must be controlled by different micro-controllers having different operational cycles, so that the micro-controllers must be provided as many as the number of the newly supplied refrigerator, for thus significantly increasing the installation cost.

SUMMARY OF THE INVENTION

Accordingly, it is an object of the present invention to provide an expandable type refrigerator which overcomes the aforementioned problem encountered in the conventional art.

It is another object of the present invention to provide an expandable type refrigerator which is capable of coupling a plurality of refrigerating units or freezing units which each have independent operational cycles and a predetermined size and is easily expanded at the installation site of a refrigerator by coupling a plurality of the refrigerating units or freezing units. To this end, a refrigerator is formed by coupling a plurality of the refrigerating units or freezing units with the refrigeration being controlled by one micro-controller using one power cord.

To achieve the above objects, there is provided an expandable type refrigerator which includes more than at least two refrigerating units (or two freezing units) each of which is operable with a different operational cycle and which refrigerating units are coupled to each other at an installation site, a coupling apparatus for coupling the refrigerating units, one external power cord for supplying an electric power to the refrigerating units (or the freezing units), and an operational cycle controller for independently controlling the operational cycles of the refrigerating units (or the freezing units).

To achieve the above objects, there is also provided an expandable type refrigerator which includes more than at least two refrigerating units (or two freezing units) each of which is operable with a different operational cycle and which refrigerating units are coupled to each other at an installation site, a coupling apparatus for coupling the refrigerating units, one external power cord for supplying an electric power to the refrigerating units (or the freezing units), and an integration type operational cycle controller for integrally controlling the operational cycles of the refrigerating units (or the freezing units).

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 12 is a table illustrating a system coupling configuration for refrigerating units based on the operation of a refrigerating/freezing function selection unit disposed in an expandable type refrigerator according to the present invention; and FIG. 13 is a flow chart illustrating an operational process of a cycle controller disposed in an expandable type refrigerator according to the present invention.

DETAILED DESCRIPTION OF THE INVENTION

The construction of an expandable type refrigerator according to the present invention will now be explained with reference to the accompanying drawings.

First, in order to fabricate the expandable type refrigerator according to the present invention, left, central, and right refrigerating units or freezing units which are operated by independent cycles are prepared.

At this time, the refrigerating units and the freezing units are preferably formed in the same structure (in view of size, height, depth, etc), with the compressor and condenser of a freezing cycle apparatus installed in the machinery compartment being different in their performances and types. The refrigerating unit and the freezing unit are referred to as a refrigerating unit in a view of their structures.

Here, the refrigerating units and freezing units are independently fabricated by using a compressor and operational cycles based on the temperature range of the refrigerator because it is possible to reduce the fabrication cost rather than to integrally fabricate a refrigerating and freezing type unit.

The constructions of a left refrigerating unit 100, a central refrigerating unit 200, and a right refrigerating unit 300 will now be explained.

Figure 1:
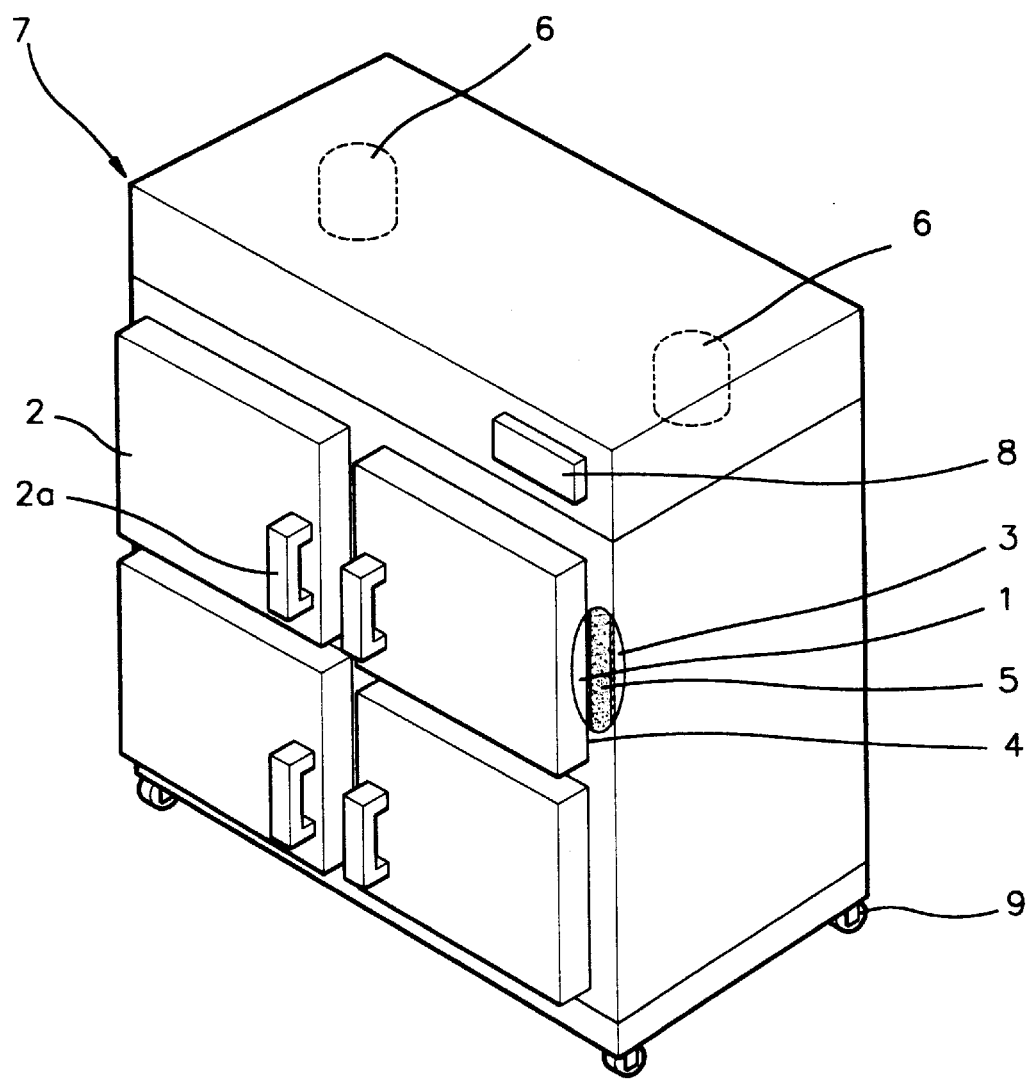
FIG. 1 is a perspective view illustrating a conventional refrigerator.
Figure 2:
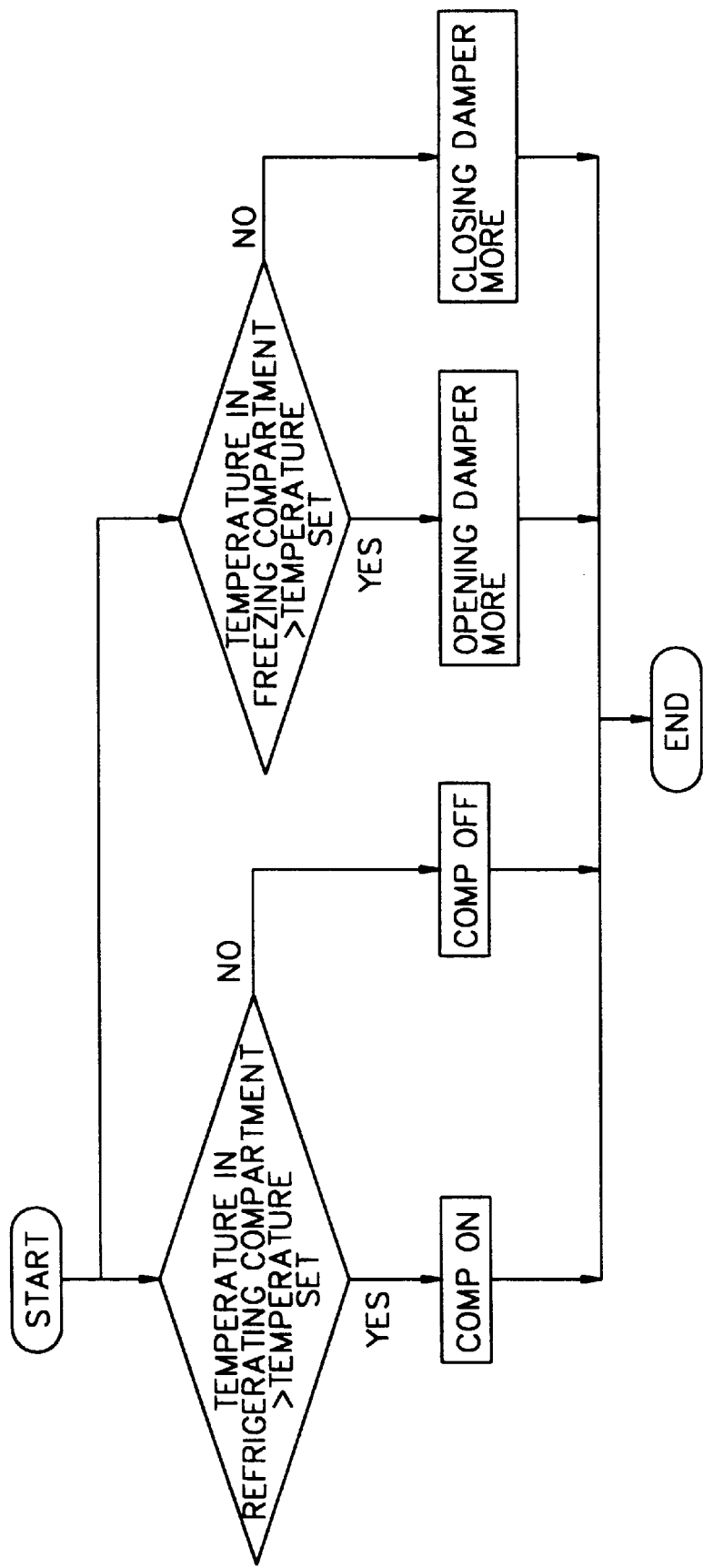
FIG. 2 is a flow chart illustrating an operational sequence of a conventional refrigerator.
Figure 3A:
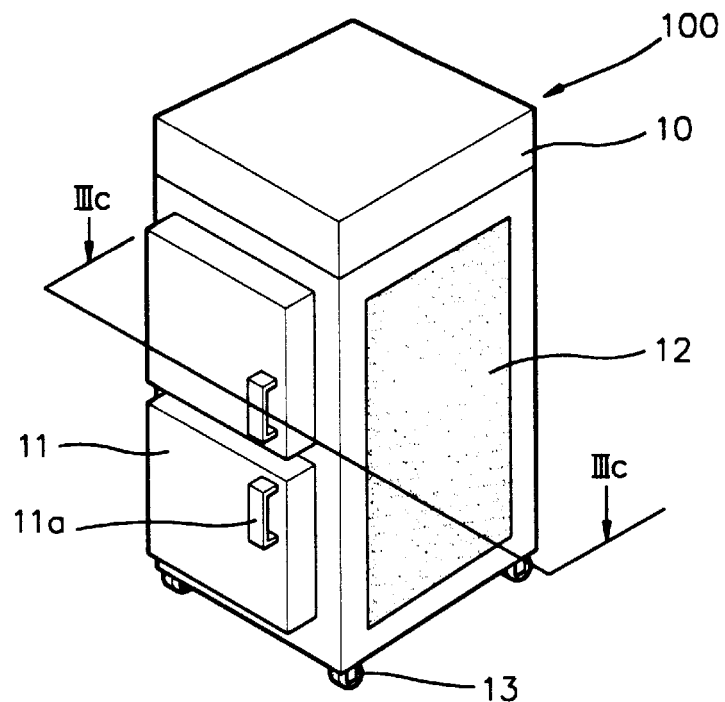
FIG. 3A is a perspective view illustrating a left refrigerating unit or a freezing unit adapted to be expanded for forming an expandable type refrigerator according to the present invention when viewing the same at a front left hand portion.
Figure 3B:
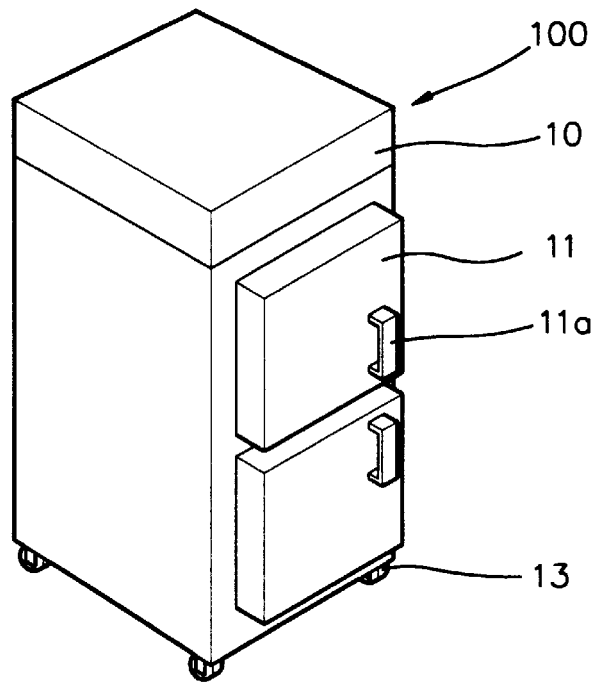
FIG. 3B is a perspective view illustrating a left refrigerating unit or a freezing unit adapted to be expanded for forming an expandable type refrigerator according to the present invention when viewing the same at a front right hand portion.

As shown in FIGS. 3A and 3B, the machinery section 10 in which a compressor (not shown) is installed is formed in an upper portion of a left refrigerating unit 100 which is adapted to be expanded for forming an expandable type refrigerator according to the present invention. In addition, doors 11 having door knobs 11a are installed on the front surface of the left refrigerating unit 100.

Differently from the conventional refrigerator, in the present invention, a micro-controller is not installed on the front surface of the machinery section 10. A power cord connection section is formed in the rear surface of the machinery section 10 for electrically connecting a micro-controller with other refrigerating units, for thus controlling the refrigerating units.

In addition, when viewing the left refrigerating unit 100 at a front portion, the left surface of the left refrigerating unit 100 is formed of a steel plate, and the right surface of the same is formed of an insulation member 12 such as a urethan foam except for the edge portions thereof.

Figure 3C:
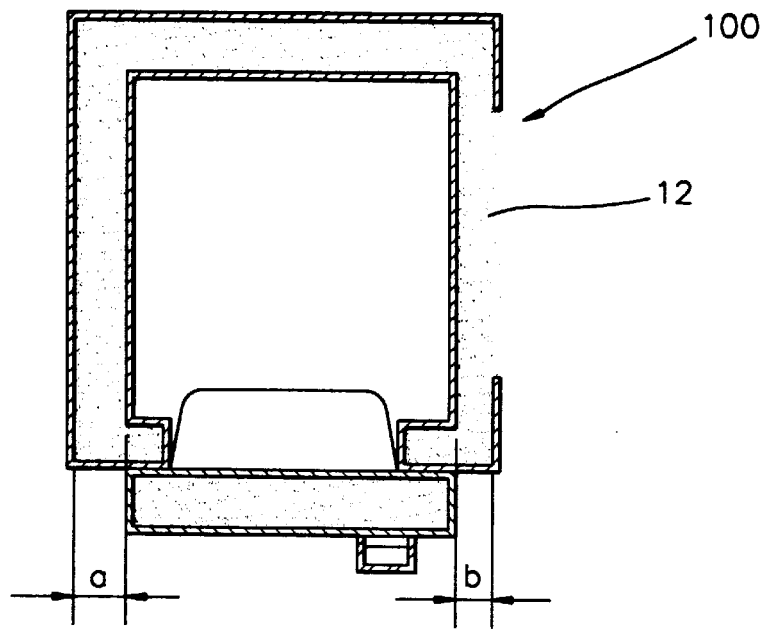
FIG. 3C is a cross-sectional view taken along line IIIc—IIIc of FIG. 3A.

Here, the thickness "b" of the sidewall formed of the insulation member 12, as shown in FIG. 3C, is thinner than the thickness "a" of the sidewall formed of the steel plate, so that since the sidewall formed of the insulation member 12 contacts with another sidewall also formed of the insulation member, the entire thickness of the sidewalls formed of the insulation member is similar to the thickness "b" of the sidewall formed of the steel plate.

Preferably, the thickness "b" is one-half of the thickness "a".

In the drawings, the reference numeral 13 denotes a wheel for easily moving the left refrigerating unit 100.

Figure 4A:
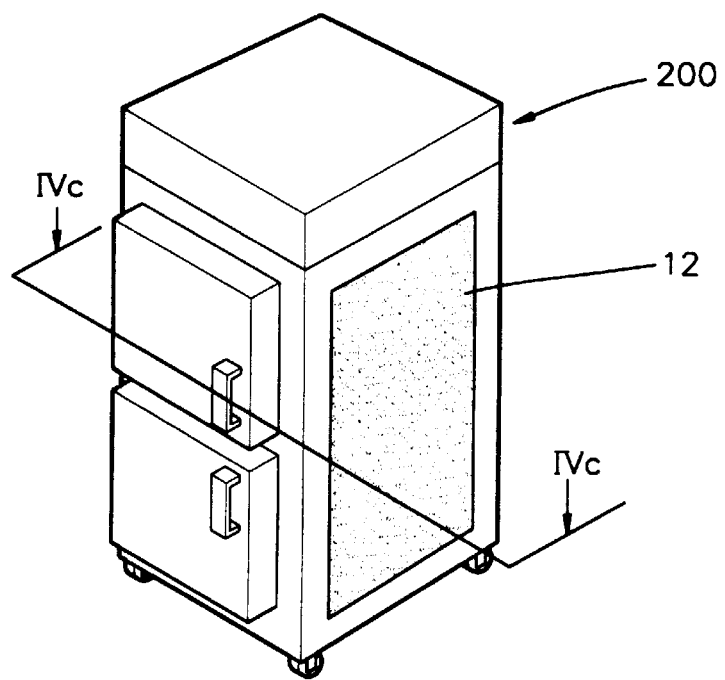
FIG. 4A is a perspective view illustrating a perspective view illustrating a central refrigerating unit or a freezing unit which is adapted to be expanded for forming an expandable type refrigerator according to the present invention when viewing the same at a front left hand portion.
Figure 4B:
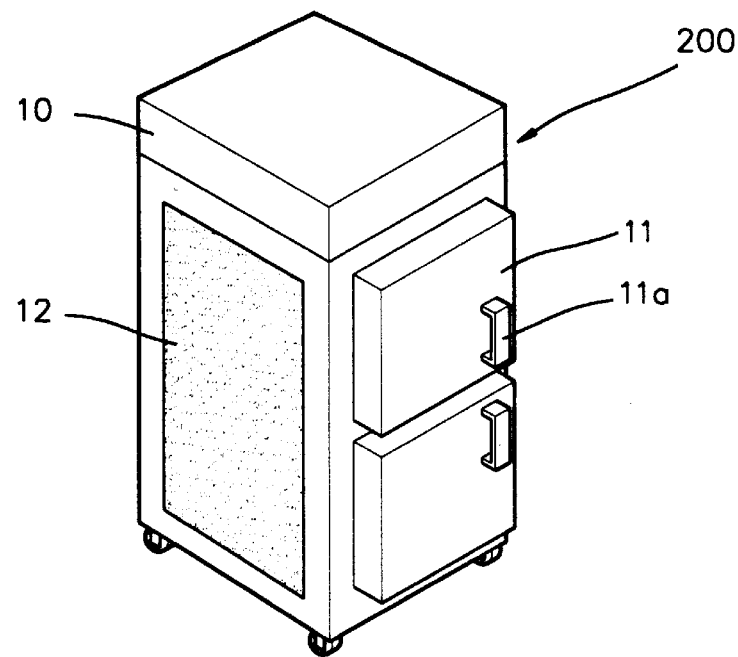
FIG. 4B is a perspective view illustrating a central refrigerating unit or a freezing unit of FIG. 4A according to the present invention when viewing the same at a front right hand portion.
Figure 4C:
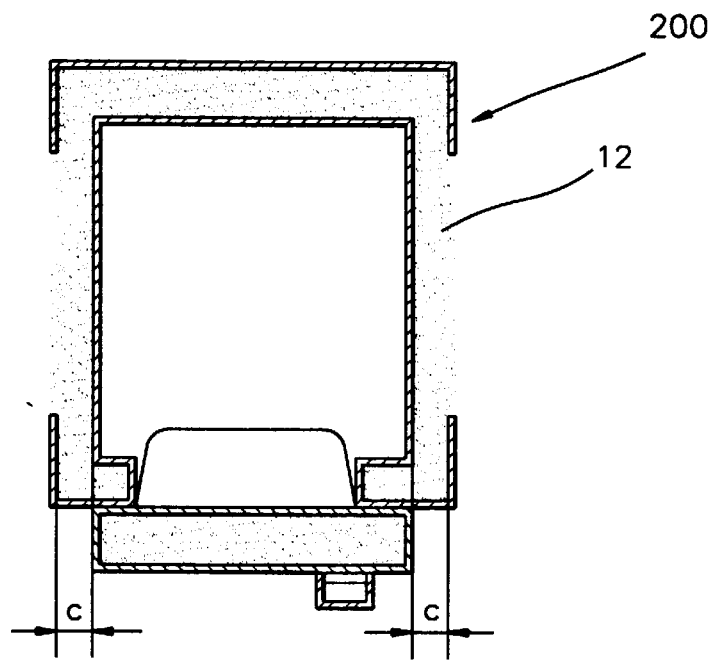
FIG. 4C is a cross-sectional view taken along line IVc—IVc of FIG. 4A.

As shown in FIGS. 4A through 4C, the construction of a central refrigerating unit 200 is the same as the left refrigerating unit except that left and right sidewalls of the central refrigerating unit 200 are formed of an insulation member 12 such as a urethan foam. In addition, the thicknesses "c" of the left and right sidewalls are the same as the thickness "a" of the sidewall of the left refrigerating unit 100 formed of a urethan foam.

Figure 5A:
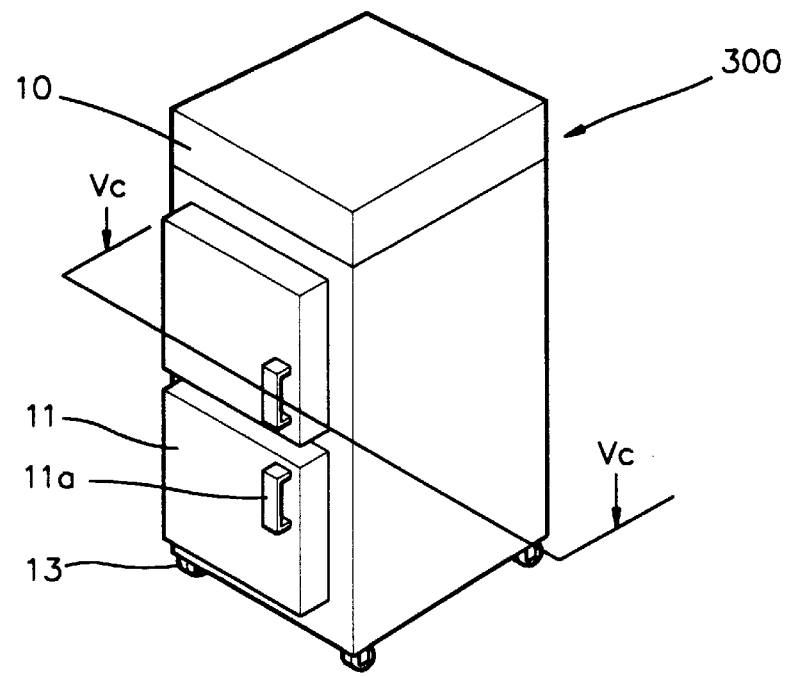
FIG. 5A is a perspective view illustrating a right refrigerating unit or a freezing unit which is adapted to be expanded for forming an expandable type refrigerator according to the present invention when viewing the same at a front left hand portion.
Figure 5B:
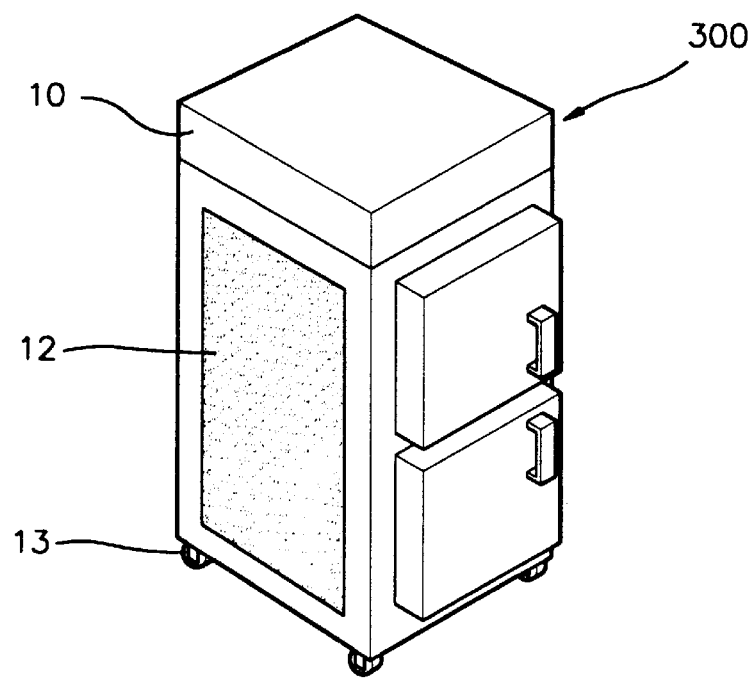
FIG. 5B is a perspective view illustrating a perspective view illustrating a right refrigerating unit or a freezing unit which is adapted to be expanded for forming an expandable type refrigerator according to the present invention when viewing at a front right hand portion.
Figure 5C:
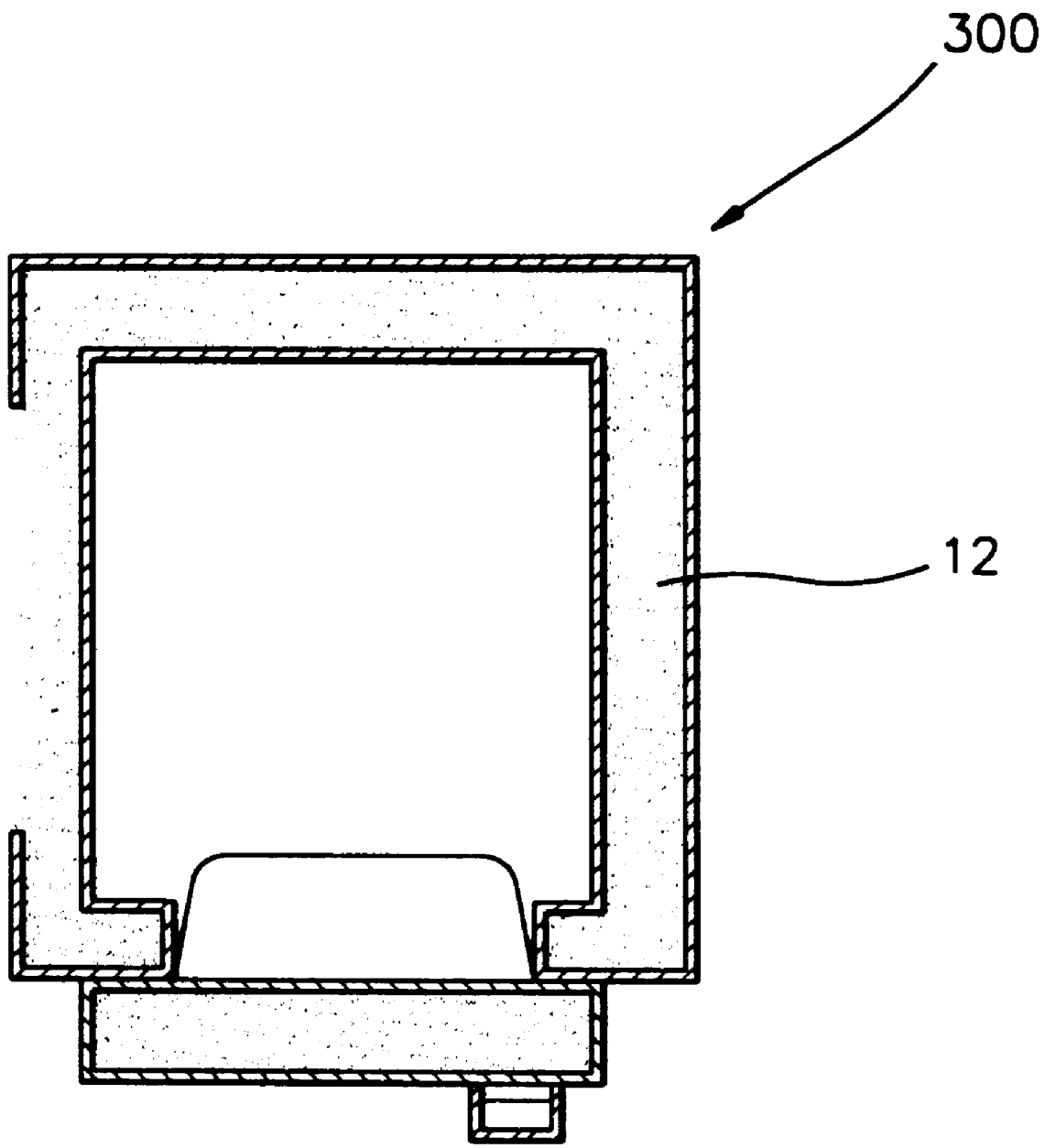
FIG. 5C is a cross-sectional view taken along line Vc—Vc of FIG. 5A.

As shown in FIGS. 5A through 5C, the construction of a right refrigerating unit 300 is the same as the left refrigerating unit 100 except that a sidewall of the right refrigerating unit 300 which sidewall is formed of an insulation member 12 is opposite to that of the left refrigerating unit 100. Namely, the left sidewall of the right refrigerating unit 300 is formed of the insulation member 12, and the right sidewall of the same is formed of the steel plate.

Therefore, the left, central, and right refrigerating units are coupled with one another by using a coupling member, for thus forming the expandable refrigerator according to the present invention.

Figure 6:
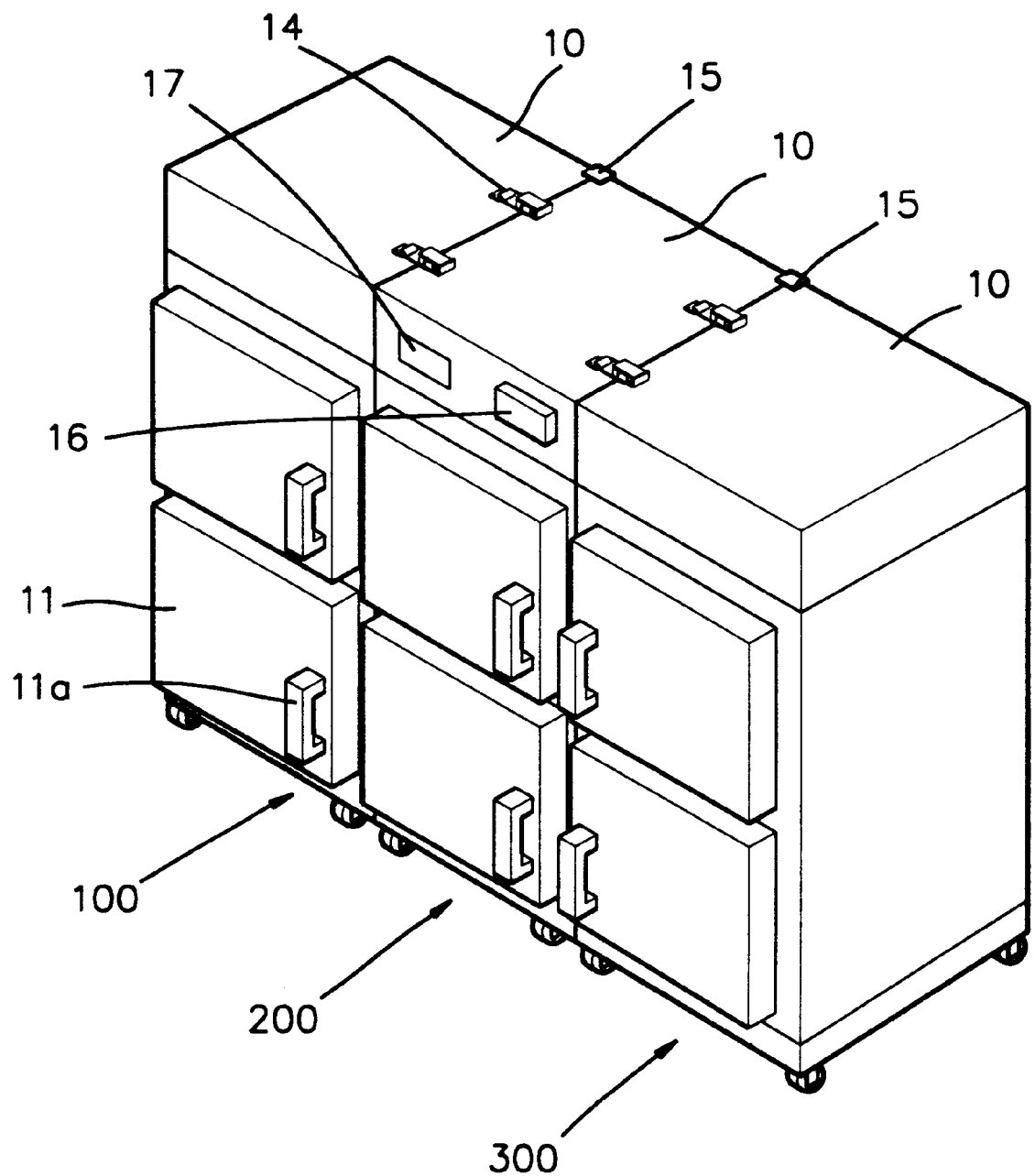
FIG. 6 is a front side perspective view illustrating an expandable type refrigerator according to the present invention.

The coupling member will now be explained with reference to FIGS. 6 through 8.

A plurality of clamps 14a are attached on the upper surface of the machinery section 10 formed in the upper portion of one refrigerating unit and the rear surface of the refrigerating unit, respectively, and a plurality of clamp hangers 14b are attached to the portions of another refrigerating unit, which portions match with the clamps 14a, and then are coupled with the clamps 14a, for thus forming a clamp coupling section 14.

Therefore, since the neighboring refrigerating units are tightly coupled by using the clamps 14a and the clamp hangers 14b, the neighboring insulation members 12 closely contact with each other, for thus forming the expandable refrigerator according to the present invention.

Figure 8:
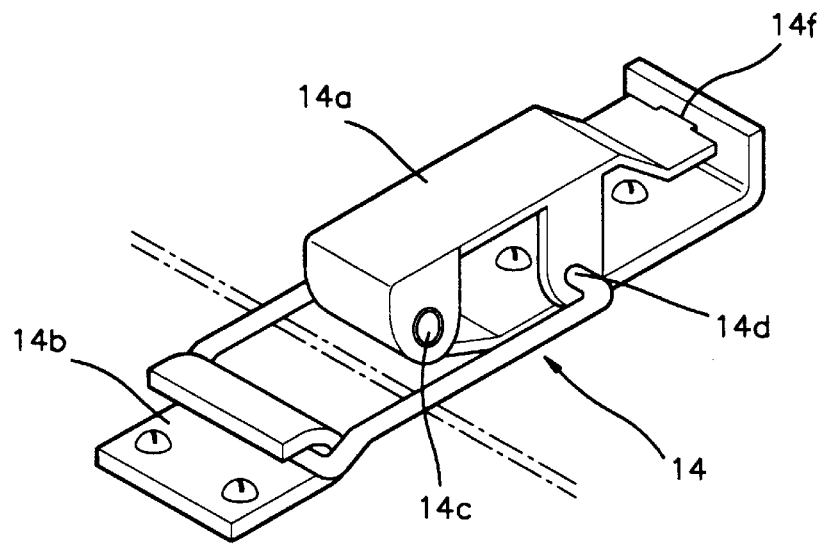
FIG. 8 is a perspective view depicting a state that a clamp which is adapted as a coupling member and a clamp hanger are coupled in an expandable type refrigerator according to the present invention.

As shown in FIG. 8, after the clamps 14a and the clamp hangers 14b are coupled, since the heights of a rotational axis 14c and the center line of an operational center point 14d are different, and there is provided an escaping prevention member 14f, the clamps 14a and the clamp hangers 14b are not easily uncoupled.

Figure 7:
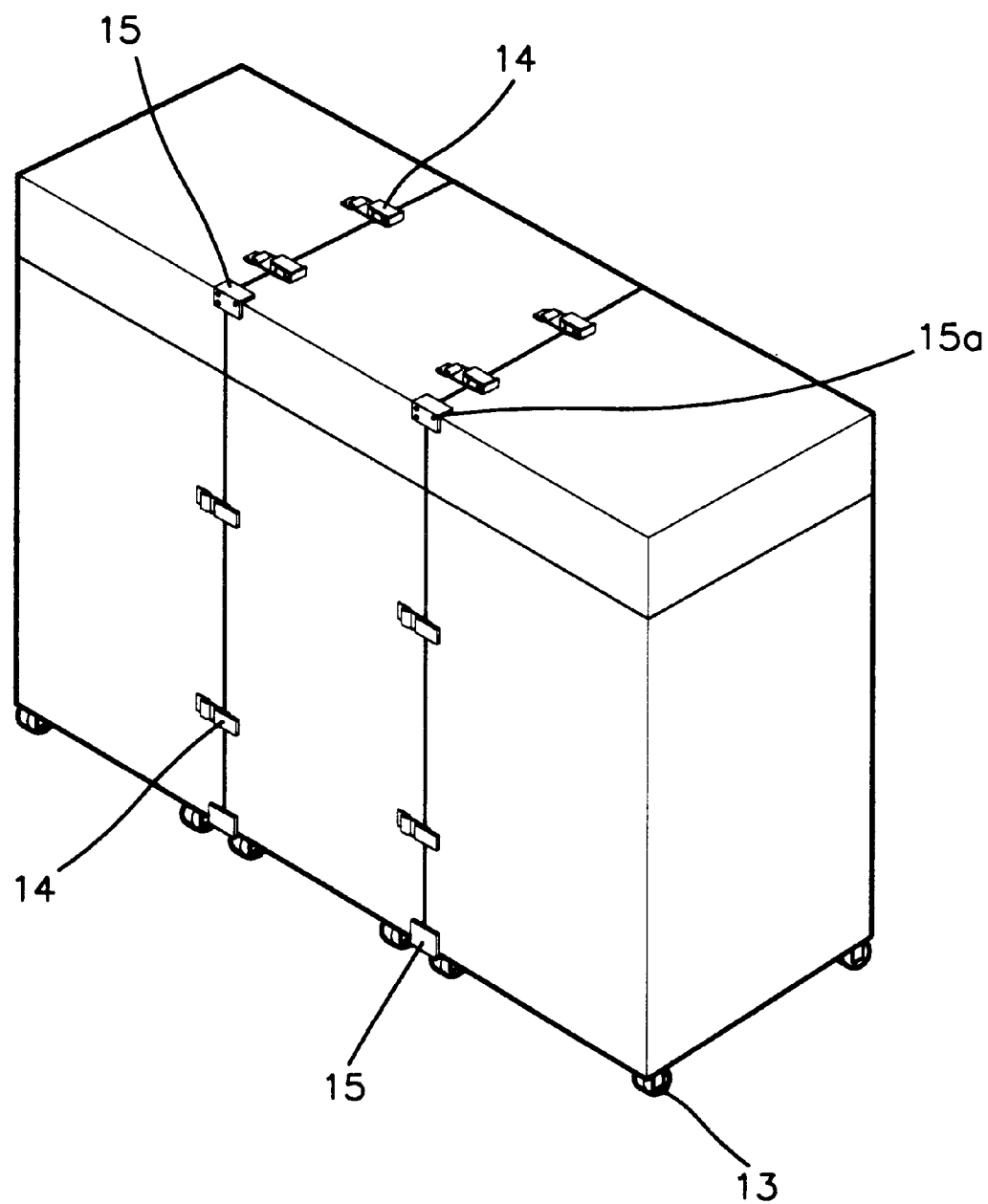
FIG. 7 is a back side perspective view illustrating an expandable type refrigerator according to the present invention.
Figure 9:
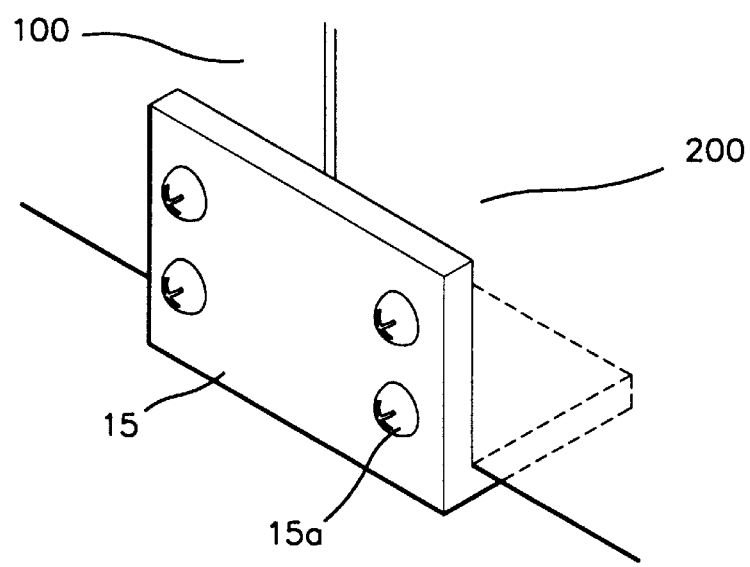
FIG. 9 is a perspective view depicting a state that two refrigerating units are engaged by using a bracket which is adapted as an auxiliary coupling member and screws for forming an expandable type refrigerator according to the present invention.

In addition, as shown in FIGS. 7 through 9, since the clamp section 14 is formed of the clamps 14a and the clamp hangers 14b for more tightly coupling the refrigerating units, the neighboring refrigerating units are coupled with each other by using a bracket 15 and bolts 15a attached to the upper and lower corners of the rear surfaces of the neighboring refrigerating units, it is possible to more tightly couple the neighboring refrigerating units.

When the coupling of the neighboring refrigerating units is finished, a microcontroller 16 and a display unit 17 for displaying refrigerating and freezing states of the refrigerating unit or freezing unit are attached to one of the refrigerating units. Thereafter, the micro-controller 16 is connected with an external power cord. In addition, the power cords are connected to each other so that power is supplied to the refrigerating units, respectively, for thus forming an expandable refrigerator.

The above-described coupling procedure is performed in the installation site of the expandable refrigerator.

In another embodiment of the present invention, a plurality of refrigerating units are installed between the left and right refrigerating units, so that it is possible to satisfy various demands of a user. In addition, the refrigerating and freezing type units having the identical compressor performance and operational cycles may be disposed in the above-described manner, for thus forming an expandable refrigerator.

The operation of the expandable refrigerator according to the present invention will now be explained with reference to the accompanying drawings.

Figure 10:
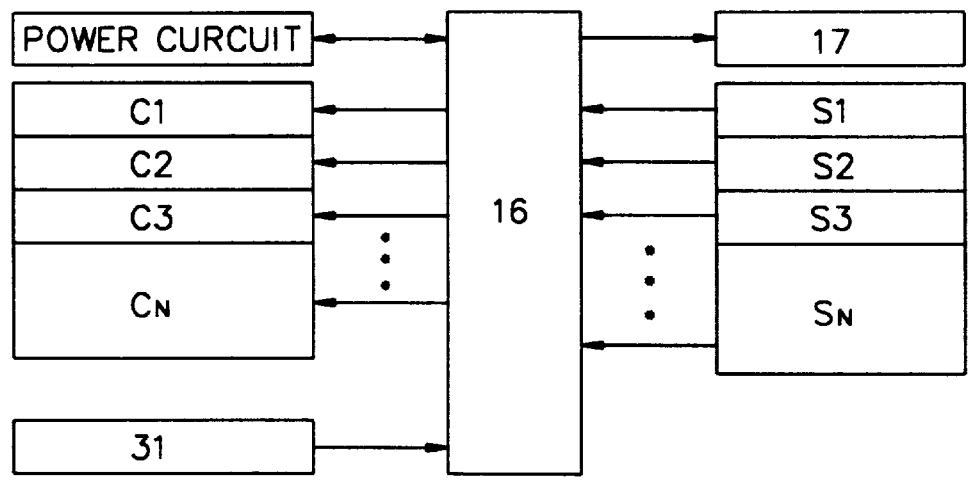
FIG. 10 is a diagram illustrating an operational process in which an operational cycle of an expandable type refrigerator according to the present invention is controlled by a micro-controller disposed in an expandable type refrigerator according to the present invention.
Figure 11:
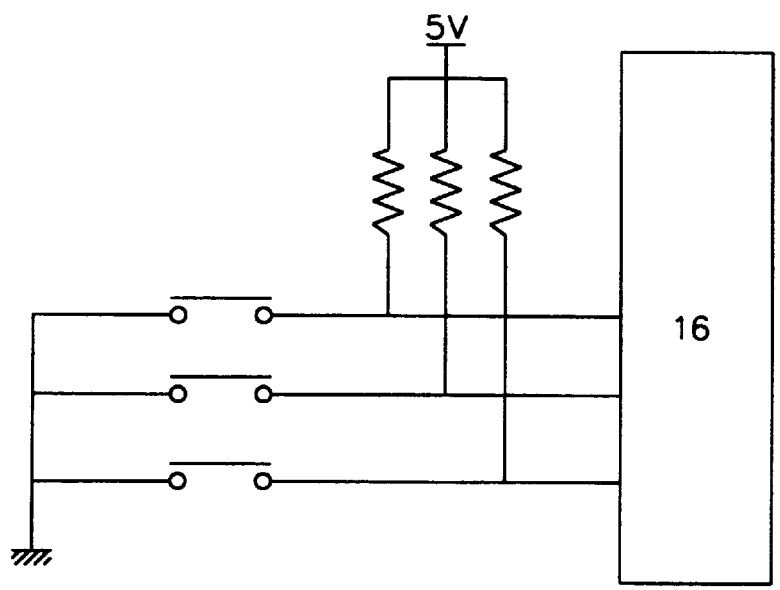
FIG. 11 is a diagram illustrating a refrigerating/freezing function selection unit for a cycle controller disposed in an expandable type refrigerator according to the present invention.

As shown in FIG. 11, in the refrigerating/freezing function selection circuit of an operational cycle control apparatus using a micro-controller, when a switch is in an off-state, a high level voltage H is generated and applied, and when the switch is in an on-state, a low level voltage L is generated and applied, for example, on the assumption that as shown in FIG. 12 a "refrigerating+refrigerating+freezing" configuration is selected, the switch 40 of the refrigerating/freezing function selection unit 31 is sequentially turned on, turned on, and turned off, and then the selected configuration information is inputted into a micro-controller 16 as shown in FIG. 10.

The micro-controller 16 receives the data from a first sensor S1 and a second sensor S2, respectively, and controls a first compressor C1 and a second compressor C2. The first and second refrigerating units are used as a refrigerating compartment, and the third refrigerating unit is used as a freezing compartment the cooling state of which is controlled by the compressor C3 by receiving a data from the third sensor S3.

In the drawings, Cn denotes the n-th compressor, and Sn denotes the n-th sensor.

Here, the operation of the expandable refrigerator will now be explained with reference to FIG. 13.

As shown therein, the function selected by the refrigerating/freezing function selection unit 31 is detected and judged by the micro-controller 16.

For example, a "refrigerating+refrigerating+freezing" configuration is selected, the temperature of the refrigerating compartment is detected by the sensor disposed in the range of the first operational cycle, and then the thusly detected temperature is compared with the set temperature. As a result of the comparison, if the temperature of the refrigerating compartment is higher than that of the set temperature, the compressor is driven, for thus lowering the temperature, and the temperature of the refrigerating compartment reaches a predetermined set temperature, the compressor is stopped.

In addition, the temperature of the refrigerating compartment detected by the sensor disposed in the range of the second operational cycle is compared with the set temperature. As a result, if the temperature of the refrigerating compartment is higher than the set temperature, the compressor is driven, for thus lowering the temperature, and when the temperature of the refrigerating compartment reaches a set temperature, the compressor is stopped.

In addition, the temperature of the freezing compartment is detected by the sensor disposed in the range of the third operational cycle, and then is compared with the set temperature. As a result of the comparison, if the temperature of the freezing temperature is higher than the set temperature, the compressor is driven, for thus lowering the temperature. In addition, when the temperature of the freezing compartment reaches a set temperature, the compressor is stopped.

If a "freezing+refrigerating+refrigerating" configuration is selected, in the first and second operational cycles, the temperature of the refrigerating compartment is detected, and then the thusly detected temperature is compared with a set temperature. However, in the third operational cycle, the temperature of the refrigerating compartment is compared with the set temperature.

The remaining operation is omitted for simplification.

As described above, in the expandable type refrigerator according to the present invention, it is possible to select the number of the refrigerating units (or the freezing units) based on the demand of the user. The thusly selected refrigerating units are moved to the installation site of the restaurant or the like, and then are assembled there for forming an expandable type refrigerator. In addition, it is possible to easily change the shape and capacity of the expandable type refrigerator based on the installation site environment.

In addition, since electric power is supplied to the refrigerating units (or the freezing units), respectively, through one power cord after the refrigerating units are coupled, the refrigerating units (or the freezing units) are independently controlled by one micro-controller without hanging the operational cycle, so that it is possible to fabricate the expandable type refrigerator having large capacity at low cost.

Furthermore, if there is an operational error in one among a plurality of the refrigerating units (of the freezing units), since the refrigerating unit in which the operational error occurred is easily changed with a new one, it is more effectively maintain the refrigerating system.

Although the preferred embodiment of the present invention has been disclosed for illustrative purposes, those skilled in the art will appreciate that various modifications, additions and substitutions are possible, without departing from the scope and spirit of the invention as recited in the accompanying claims.

What is claimed is:

1. An expandable type refrigerator, comprising:
   more than two refrigerating units each independently having a freezing cycle apparatus and each being assembled at an installation site;
   a coupling means for coupling the refrigerating units;
   an external power cord connected with the refrigerating units and supplying an elevated power to a wiring portion; and
   an integrated cycle controller for independently controlling each of the cycles of the refrigerating units.

2. The refrigerator of claim 1, wherein said cycle controller includes:
   a sensor for detecting an internal temperature of the refrigerating units;
   a refrigerating/freezing function selection unit for providing a refrigerating/freezing function to the refrigerating units;
   a display unit engaged with corresponding refrigerating units for displaying the refrigerating state of the refrigerating units;
   a micro-controller connected with the external power cord and engaged with corresponding refrigerating units for receiving signals from the sensor and the refrigerating/freezing function selection unit; and
   a wire connected with a corresponding refrigerating unit in the micro-controller and display apparatus.

3. The apparatus of claim 2, wherein said refrigerating/freezing function selection unit selects a freezing function by applying a high level voltage when a switch is in an off state, and selects a refrigerating function by applying a low level voltage when a switch is in an off state.

4. The apparatus of claim 1, wherein said coupling means includes:
   a plurality of clamps attached to upper surfaces and rear surfaces of the refrigerating units; and
   a plurality of clamp hangers attached to the portions matching with the portions of the clamps, whereby the clamps and the clamp hangers are coupled when coupling the refrigerating units.

5. The apparatus of claim 1, wherein said coupling means includes:
   a plurality of clamps attached to upper surfaces and rear surfaces of the refrigerating units;
   a plurality of clamp hangers attached to the portions matching with the portions of the clamps, whereby the clamps and the clamp hangers are coupled when coupling the refrigerating units; and
   a plurality of brackets and bolts attached on the rear surface butting portions and upper and lower corners of the refrigerating units which closely contact with each other for forming an expandable type refrigerator.

6. The refrigerator of claim 1, wherein when coupling the refrigerating unit, the surfaces exposed to the outside of the refrigerating units positioned at both sides are covered by a metallic plate surrounded by an adiabatic material except for those surfaces coupled with other refrigerating units.

7. The refrigerator of claim 6, wherein a thickness of the surface in which the adiabatic material is exposed is thinner than the surface covered by the metallic plate.

8. The refrigerator of claim 6, wherein the surface in which the adiabatic material is exposed is one half of the thickness of the surface covered by the metallic plate.

9. The refrigerator of claim 1, wherein said refrigerating units are coupled, both sides connected with the refrigerating units positioned between the refrigerating units have the exposed adiabatic material except for the rim portions.

10. The refrigerator of claim 9, wherein the thickness of the surface in which the adiabatic material is exposed is thicker than the thickness of the surface covered by a metallic plate.

11. The refrigerator of claim 9, wherein the thickness of the surface in which the adiabatic material is exposed is one half of the thickness of the surface covered by the metallic plate.

12. The refrigerator of claim 1, wherein said refrigerating units are substituted with freezing units by a user.

* * * * *